US012692857B2

(12) United States Patent
Lead et al.

(10) Patent No.: US 12,692,857 B2
(45) Date of Patent: Jul. 28, 2026

(54) MASSIVELY PARALLEL FLOW-THROUGH SYSTEM FOR NANOPARTICLE SYNTHESIS

(71) Applicant: UNIVERSITY OF SOUTH CAROLINA, Columbia, SC (US)

(72) Inventors: Jamie R. Lead, Columbia, SC (US); Paul Vecchiarelli, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 0 days.

(21) Appl. No.: 18/597,281

(22) Filed: Mar. 6, 2024

(65) Prior Publication Data

US 2024/0376884 A1 Nov. 14, 2024

Related U.S. Application Data

(60) Provisional application No. 63/500,642, filed on May 8, 2023.

(51) Int. Cl.
*F04B 43/12* (2006.01)
*B82Y 25/00* (2011.01)
(Continued)

(52) U.S. Cl.
CPC .......... *F04B 43/1292* (2013.01); *B82Y 25/00* (2013.01); *B82Y 30/00* (2013.01); *B82Y 40/00* (2013.01)

(58) Field of Classification Search
CPC .. F04B 43/12; F04B 43/1253; F04B 43/1292; B82Y 25/00; B82Y 30/00; B82Y 40/00; B01J 19/0093; Y10S 977/773–777
See application file for complete search history.

(56) References Cited

U.S. PATENT DOCUMENTS 9,835,628 B2    12/2017 Lead et al.
10,071,919 B2    9/2018 Lead et al.
(Continued)

FOREIGN PATENT DOCUMENTS

JP          2011050813 A       3/2011

OTHER PUBLICATIONS

Betke, et al. "Bottom-up, wet chemical technique for the continuous synthesis of inorganic nanoparticles" *Inorganics* 2(1) (2014) pp. 1-15.
(Continued)

*Primary Examiner* — Loren C Edwards
(74) *Attorney, Agent, or Firm* — DORITY & MANNING, P.A.

(57) ABSTRACT

Massively parallel systems and methods are described suitable for high throughput and large-scale production of highly consistent nanoparticles. The systems include a device that utilizes a single pump to pump a reaction mixture simultaneously through multiple formation channels. One or more devices can be utilized in a single production line, and a system can include multiple production lines. A device of a system provides essentially identical interaction conditions throughout the multiple channels with highly controllable and consistent pumping conditions to provide well-controlled and consistent flow conditions in the channels. This consistency allows for well-defined reaction formation chemistry and thereby provides highly consistent nanoparticle products in large quantities in a short time period.

11 Claims, 10 Drawing Sheets

(51) Int. Cl.
    *B82Y 30/00*     (2011.01)
    *B82Y 40/00*     (2011.01)

(56)          References Cited

U.S. PATENT DOCUMENTS

| | | | |
|---|---|---|---|
| 10,174,136 B2 | 1/2019 | Lead | |
| 2008/0034921 A1 | 2/2008 | Vanheusden et al. | |
| 2009/0246143 A1 | 10/2009 | Bonitatibus et al. | |
| 2010/0059449 A1 | 3/2010 | Grass et al. | |
| 2010/0166870 A1 | 7/2010 | Iyer et al. | |
| 2011/0124492 A1 | 5/2011 | Loukine et al. | |
| 2013/0004417 A1* | 1/2013 | Robertson | B82Y 40/00 |
| | | | 977/773 |
| 2014/0042068 A1 | 2/2014 | Namiki | |
| 2014/0264171 A1* | 9/2014 | Schut | C01G 21/21 |
| | | | 204/157.43 |
| 2015/0041399 A1 | 2/2015 | Tennant | |
| 2015/0298993 A1 | 10/2015 | Lead | |
| 2017/0190967 A1* | 7/2017 | Dogan | C01G 11/02 |
| 2017/0247481 A1 | 8/2017 | Lead | |
| 2019/0345050 A1 | 11/2019 | Lead et al. | |
| 2021/0261431 A1* | 8/2021 | Curry | B01J 19/24 |
| 2022/0169453 A1 | 6/2022 | Vecchiarelli et al. | |
| 2024/0010536 A1 | 1/2024 | Lead et al. | |

OTHER PUBLICATIONS

Cao et al., Ceria Hollow Nanospheres Produced by a Template-Free Microwave-Assisted.

Chen, et al. "Synthesis of highly hydrophobic floating magnetic polymer nanocomposites for the removal of oils from water surface" *Appl. Surf. Sci.* 286 (2013) pp. 249-256.

Cheng et al. "Synthesis of carbon-coated, porous and water-dispersive Fe 3 O 4 nanocapsules and their excellent performance for heavy metal removal applications", Dalton Transactions, 2012, 41, 5854-5861.

Chin, et al. "Synthesis and characterization of magnetic iron oxide nanoparticles via w/o microemulsion and Massart's procedure" J Mater. Proc. Tech. 191(1) (2007) pp. 235-237.

Chu, et al. "Three-Dimensionally Macroporous Fe/C Nanocomposites as Highly Selective Oil-Absorption Materials" *Appl. Mater. Inter.* 4(5) (2012) pp. 2420-2425.

Fayazi et al., Synthesis and application of novel ion-imprinted polymer coated magnetic multi-walled carbon nanotubes for selective solid phase extraction of lead (II) ions, Materials Science and Engineering: C, 2016, 60, 365-373.

Gui, et al. "Magnetic and Highly Recyclable Macroporous Carbon Nanotubes for Spilled Oil Sorption and Separation" *Appl. Mater. Interf.* 5 (2013) pp. 5845-5850.

Hanif et al., Removal of chromium (VI) and dye Alizarin Red S (ARS) using polymer-coated iron oxide (Fe3O4) magnetic nanoparticles by co-precipitation method, Journal of nanoparticle research, 2014, 16, 2429.

Kadar, et al. "The influence of engineered $Fe_2O_3$ nanoparticles and soluble ($FeCl_3$) iron on the developmental toxicity caused by $CO_2$-induced seawater acidification" *Environmental Pollution* 158(12) (2010) pp. 3490-3497.

Kimata, et al. "Preparation of monodisperse magnetic particles by hydrolysis of iron alkoxide" *Powder Technology* 132(2) (2003) pp. 112-118.

Liu et al., Coating Fe3O4 magnetic nanoparticles with humic acid for high efficient removal of heavy metals in water, Environmental science & technology, 2008, 42, 6949-6954.

Liu et al., Synthesis and Characterization of Nanostructured Fe3O4 Micron-Spheres and Their Application in Removing Toxic Cr Ions from Polluted Water, Chemistry—A European Journal 2012, 18, 13418-13426.

Mahdavi et al., Fabrication and characterization of SiO2/(3-aminopropyl) triethoxysilane-coated magnetite nanoparticles for lead (II) removal from aqueous solution, Journal of Inorganic and Organometallic Polymers and Materials, 2013, 23, 599-607.

Mirshahghassemi, et al. "Oil Recovery from Water under Environmentally Relevant Conditions Using Magnetic Nanoparticles" Env. Sci. Tech. 49(19) (2015) pp. 11729-11736.

Nassar et al., Metal oxide nanoparticles for asphaltene adsorption and oxidation, Energy & Fuels 2011, 25, 1017-1023.

Palchoudhury, et al. "A Facile and Cost-Effective Method for Separation of Oil-Water Mixtures Using Polymer-Coated Iron Oxide Nanoparticles" Env. Sci. Tech. 48(24) (2014) pp. 14558-14563.

Pavi'a-Sanders, et al. "Robust Magnetic/Polymer Hybrid Nanoparticles Designed for Crude Oil Entrapment and Recovery in Aqueous Environments" ACS Nano 7(9) (2013) pp. 7552-7561.

Petschacher, et al. "Thinking continuously: A microreactor for the production and scale-up of biodegradable, self-assembled nanoparticles" Polymer Chemistry 4(7) (2013) pp. 2342-2352.

Rajput et al., Magnetic magnetite (Fe 3 O 4) nanoparticle synthesis and applications for lead (Pb 2+) and chromium (Cr 6+) removal from water, Journal of colloid and interface science, 2016, 468, 334-346.

Su et al., Fabrication of polymer-supported nanosized hydrous manganese dioxide (HMO) for enhanced lead removal from waters, Science of the Total Environment, 2009, 407, 5471-5477.

Wang et al., Carboxyl-functionalized nanoparticles with magnetic core and mesopore carbon shell as adsorbents for the removal of heavy metal ions from aqueous solution, Dalton Transactions, 2011, 40, 559-563.

Zhang, et al. "Superparamagnetic iron oxide nanoparticles prepared by using an improved polyol method" *Appl. Surf. Sci.* 266 (2013) pp. 375-379.

Zhang, et al. "Synthesis of PVP-coated ultra-small $Fe_3O_4$ nanoparticles as a MRI contrast agent" *J Mater Sci: Mater Med* 21 (2010) pp. 1205-1210.

Zhu, et al. "A simple method to synthesize modified $Fe_3O_4$ for the removal of organic pollutants on water surface" *Appl. Surf. Sci.* 258(17) (2012) pp. 6326-6330.

Zhu, et al. "Fast and Selective Removal of Oils from Water Surface via Highly Hydrophobic Core-Shell $Fe_2O_3$@C Nanoparticles under Magnetic Field" *Appl. Mater. Interf.* 2(11) (2010) pp. 3141-3146.

* cited by examiner

MASSIVELY PARALLEL FLOW-THROUGH SYSTEM FOR NANOPARTICLE SYNTHESIS

CROSS REFERENCE TO RELATED APPLICATION

This application claims filing benefit of U.S. Provisional Patent Application Ser. No. 63/500,642 having a filing date of May 8, 2023, which is incorporated herein by reference for all purposes.

FEDERAL RESEARCH STATEMENT

This invention was made with Government support under Grant No. 2036258, awarded by the National Science Foundation. The Government has certain rights in the invention.

BACKGROUND

A substance is considered a nanomaterial if at least one of its dimensions is between about 1 nanometer (nm) and about 100 nm. Compared to its bulk counterpart, a nanomaterial may exhibit different physicochemical properties, such as superparamagnetism, altered chemical or photocatalytic behavior, increased sorption capacity, or antibiotic activity. Nanomaterials are commonly used in paints, textiles, and personal care products, with environmental applications growing rapidly. For instance, zero-valent iron nanoparticles, semi-conductive titanium dioxide nanoparticles, carbon-based nanomaterials, and magnetic nanoparticles show promise for nano-enabled water treatment. Such environmental nanotechnology can leverage unique nanoscale properties to address pollution and other public health risks.

Many nanotechnologies have been developed on a laboratory scale in an attempt to apply the desirable properties of nanomaterials in a practical setting. Unfortunately, the demand for highly constrained nanomaterials requires well-controlled large-scale synthesis, which faces many challenges, mainly through costs and complexity. For instance, yield by current formation methods is variable and generally low, with yields of less than 33% reported for many carbon-based nanomaterials. Low yield increases costs as well as material and energy waste.

Optimizing yield, scalability, environmental production footprint, and cost over expected technological life cycle are just a few of the challenges to wider use of environmental nanotechnologies. Synthesis processes, reactants, and handling steps such as may be desirable for use in large-scale production can influence toxicity and/or behavior of nanomaterials, even when small-scale materials of the same composition have been shown to be safe at reasonable exposure levels. As such, large-scale manufacturing processes require improvement during production, deployment, and end-of-life of the nanomaterials before they will be feasible. Strategies that have been developed to mitigate cost and potential risks include process simplification and direct energy reduction, minimizing the environmental footprint of reactants (e.g., waste generation), and removing hazardous materials from the process. Implementing automation into the synthesis process may also help reduce costs, increase production, and minimize occupational exposures.

While such efforts have provided some improvement in the art, room for further improvement exists. What are needed in the art are methods and systems for large scale formation of highly consistent nanoparticles. Methods and systems that can utilize reactants of low toxicity and reduced direct energy consumption would be of great benefit to the art.

SUMMARY

According to one embodiment, disclosed is a device for production of nanomaterials. A device can include a motor that includes a shaft configured to rotate about an axis. The device also includes a pump head, which in turn includes one or more rollers. Upon attachment of the pump head to the motor shaft, the pump head and roller will be configured to rotate about the axis. The device also includes multiple channels. Each channel lies generally perpendicular to the axis of the motor shaft. Thus, the multiple channels are aligned parallel to one another and upon rotation of the motor shaft, the roller(s) of the pump head will periodically and simultaneously rotate along a length of each channel. As such, the device can simultaneously provide a pumping action to each of the multiple channels.

Also disclosed is a method for forming nanoparticles. A method can include providing a first portion of a reaction mixture to a first channel of a device and providing a second portion of the reaction mixture to a second channel of the device, the second channel being parallel to the first channel. A method can also include simultaneously pumping the first portion and the second portion through the first and second channels by use of a first pump. The first and second portions can carry a first reactant that upon reaction with a second reactant can form the nanoparticles. The second reactant can be included in the first and second portions as provided to the first and second channels, respectively, or alternatively, can be combined with the first reactant downstream of the pump. For instance, the second reactant can be in third and fourth portions of the reaction mixture that are provided to third and fourth parallel channels of a second device and simultaneously pumped through the third and fourth channels by use of a second pump. In this case, the first and second reactants can be combined downstream of the respective first and second devices, upon which the nanoparticle formation reaction can occur. The method can also include collecting the nanoparticles.

In one embodiment, the nanoparticles can be formed according to a precipitation reaction, and in one particular embodiment, according to a co-precipitation reaction to form core/shell particles, e.g., core/shell particles including a polymeric shell and a magnetic iron oxide core.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to massively parallel devices, systems, and methods that can be utilized in bulk formation of nanoparticles. More specifically, disclosed systems can provide very high throughput for large-scale production of highly consistent nanoparticles.

A device can include a pump that can simultaneously pump individual portions of a reaction mixture through each of multiple parallel formation channels. The device can thus provide essentially identical flow conditions (e.g., temperature, flow rate, flow characteristics, etc.) throughout the multiple parallel channels providing highly controllable and consistent pumping conditions. This consistency allows for well-defined reaction formation chemistry and thereby provides highly consistent nanoparticle products in large quantities in a short time period.

A system can include a plurality of individual devices and as such, has the potential to produce commercially relevant volumes of nanoparticles at a relatively low capital cost. For instance, a single production line, which can include one or more devices, depending on the specific arrangement of the line as described further herein, can produce highly consistent nanoparticles on a scale of kilograms per hour in some embodiments, providing for production of from about 10 kilograms to about 100 kilograms of nanoparticles per week in some embodiments. A system that includes multiple productions lines and that is able to operate for prolonged periods of time can thus provide for annual production at a scale of many metric tons.

Figure 1:
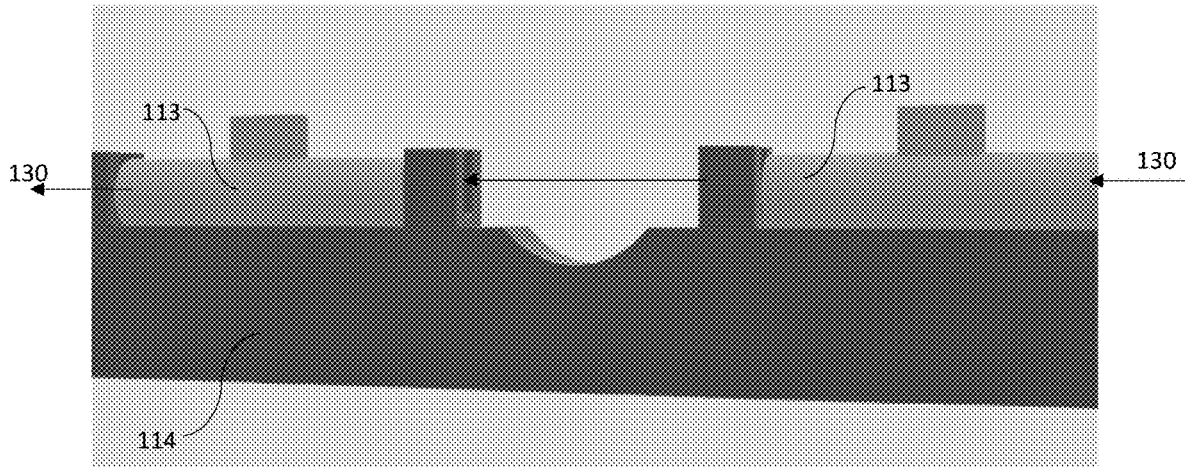
FIG. 1 schematically illustrates one embodiment of a riser of a device as described herein.

Disclosed devices include a series of parallel channels that can each simultaneously carry a portion of a reaction mixture with identical flow characteristics in each channel. FIG. 1 illustrates one embodiment of a riser 114 as may be included in a device and which defines a channel 130 therethrough. In the illustrated embodiment, the riser 114 includes connectors 113, which can be utilized to retain tubing during use. For instance, one or more sections of tubing can be retained along the channel 130 by use of the connectors 113, and during use a portion of a reaction mixture can be pumped through the tubing and the connectors 113. Of course, any retainers or connectors can be utilized to retain tubing within a channel 130, and in one embodiment, a riser 114 can be permanently affixed with an enclosed channel through which a fluid can flow, without the need of tubing held by connectors to the riser.

The size of the channels and/or tubing retained within the channels is not particularly limited, but will be of a cross-sectional area and length so as to encourage constant flow therethrough and consistent reaction conditions within a fluid carried in the channels for formation of the desired nanoparticles.

Figure 2:
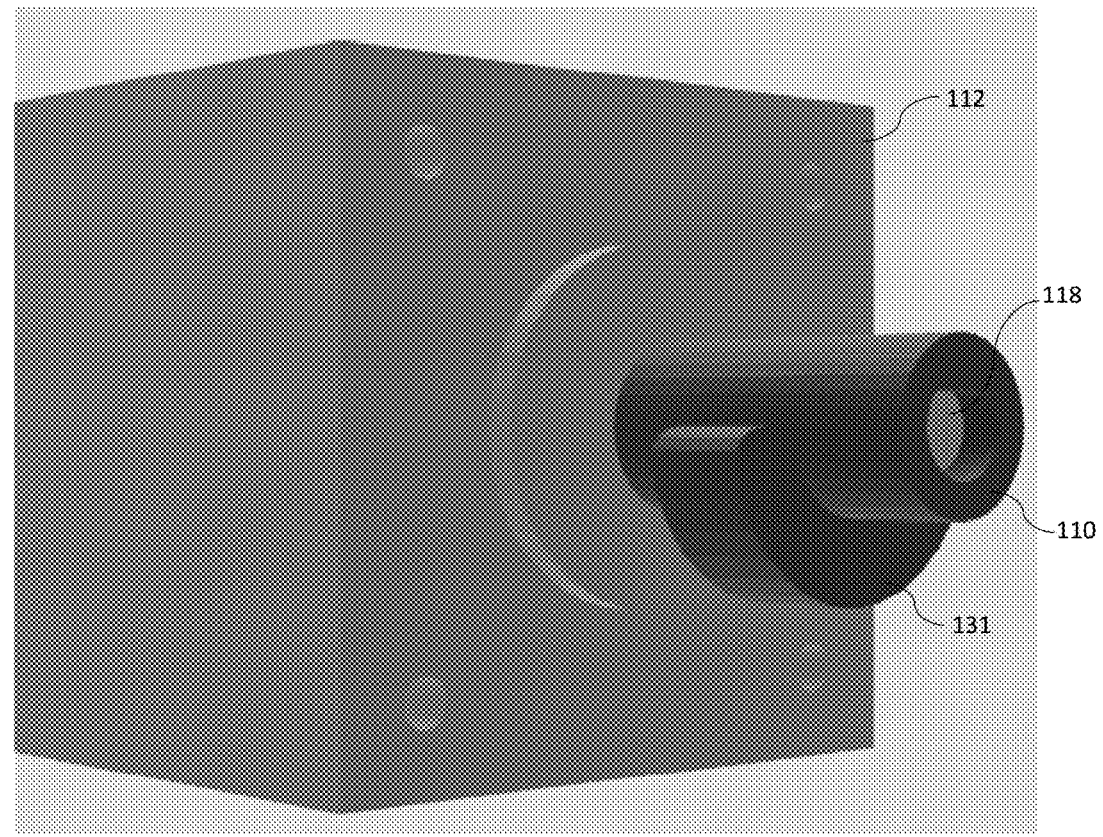
FIG. 2 schematically illustrates one embodiment of a motor and a pump head including a single roller attached thereto.

A device can also include a pump, e.g., a peristaltic pump, that can provide simultaneous and consistent flow to fluid within each of the multiple parallel channels of the device. As illustrated in FIG. 2, a pump can include a motor 112 that spins a shaft 118. The motor 112 can include associated components as are known in the art, e.g., heat sink, power supply, control systems, etc. A motor 112 can be of any suitable design, with any suitable torque source such as a DC motor or a stepper motor, multiple examples of which are known in the art. In general, the motor 112 can be selected so as to provide suitable power to enable self-priming of all of the parallel channels 130 of a device. As utilized herein, the term "self-priming" is intended to refer to the instigation of flow without additional operator input. Self-priming of a device is beneficial as this can avoid the need for manual priming of individual channels, and can save time and money during start-up of a system, particularly when considering a commercial scale synthesis that can include hundreds of individual channels in a single pump device. As is known, a device will be self-priming if the pressure head is greater than the resistance to flow.

A pump head 110 can be associated with a shaft 118 so as to spin with the shaft 118 when the motor 112 is engaged with the shaft 118. The rotational speed of the shaft 118 and the associated pump head 110 is not particularly limited, and can vary widely depending upon the desired flow speed and flow characteristics of fluid through the channels of the device. By way of example, and without limitation, a motor 112 can be configured to operate at shaft rotational speeds of about 10 rpm or greater, e.g., from about 10 rpm to about 500 rpm, from about 50 rpm to about 400 rpm, or from about 100 rpm to about 300 rpm in some embodiments. As utilized herein, the term "about" generally refers to being within 10% of the stated value.

Figure 3:
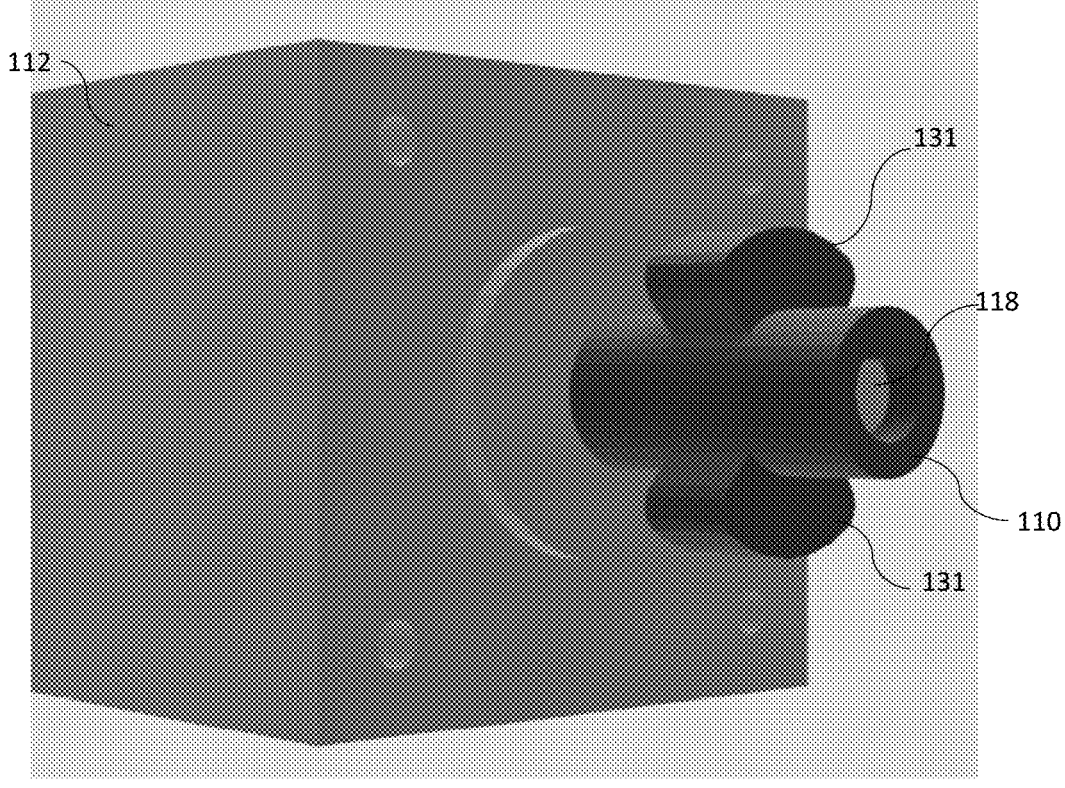
FIG. 3 schematically illustrates one embodiment of a motor and a pump head including two rollers attached thereto.
Figure 5:
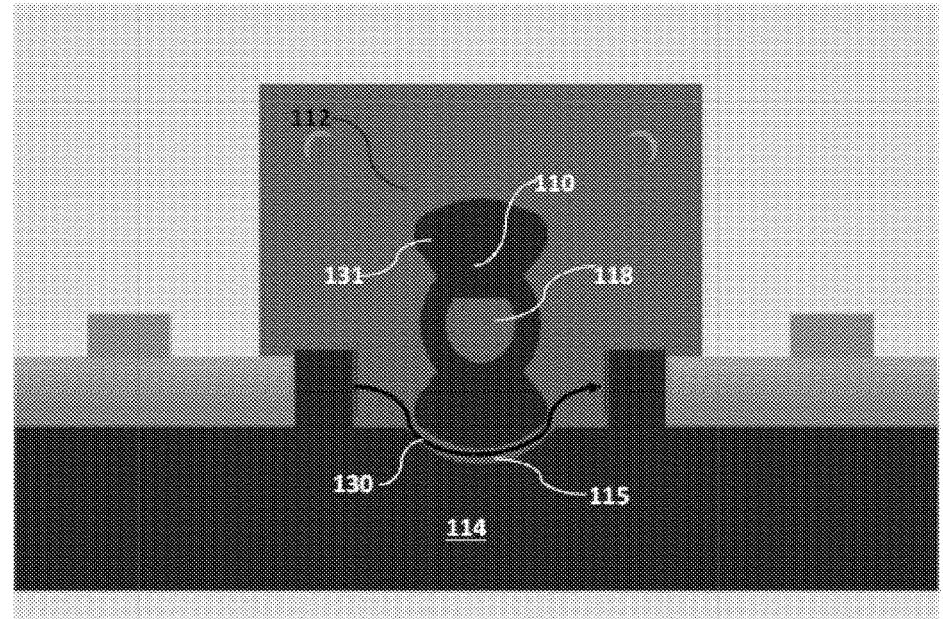
FIG. 5 provides a front schematic view of one embodiment of a device as described herein.
Figure 6:
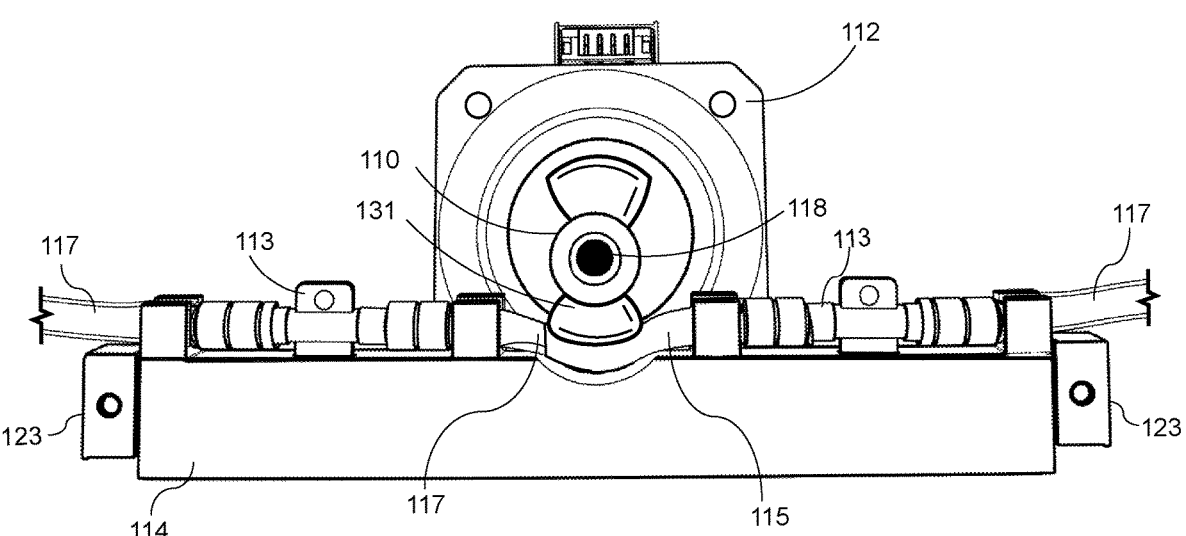
FIG. 6 provides a photograph of a front view of one embodiment of a device as described herein.

In the illustrated embodiment, the pump can be a peristaltic pump, and the pump head 110 can have any number of rollers 131. For example, FIG. 2 illustrates a pump head 110 that includes a single roller 131, while FIG. 3 illustrates a pump head 110 that includes two opposing rollers 131, however a peristaltic pump head can carry additional rollers, e.g., 1, 2, 3, 4, 5, 6, or even more individual rollers. During use, and as illustrated more clearly in FIG. 5 and FIG. 6, the roller(s) 131 of a pump head 110 will pass along and through a portion of the channel 130 in a direction that is perpendicular to the axis of rotation of the shaft 118 and pump head 110 and thus will periodically engage with tubing 117 retained in the channel(s) 130, thereby forcing fluid within the tubing 117 to pass along the length of the channel 130 with a peristaltic action. The system can include a predetermined height deficit 115 (FIG. 5) between the upper surface of the riser 114 and the lower surface of each roller 131 as it passes through the channel 130 to accommodate tubing 117 therein while providing the desired peristaltic pumping action to a fluid carried within the tubing 117. The particular height deficit 115 can vary depending upon the size of the tubing, the flow rate of the system, the flow characteristics desired within the tubing 117, etc. By way of example, in some embodiments, a height deficit between a riser 114 and a roller 131 at maximum engagement between the two can be about 0.5 mm or greater, such as from about 0.5 mm to about 5 mm, or from about 1 mm to about 3 mm.

The preferred number of rollers 131 of a pump head 110 for any particular embodiment can depend upon the fluid flow speed of a particular device and the size and speed of the motor shaft 118, among other system variables.

Figure 4:
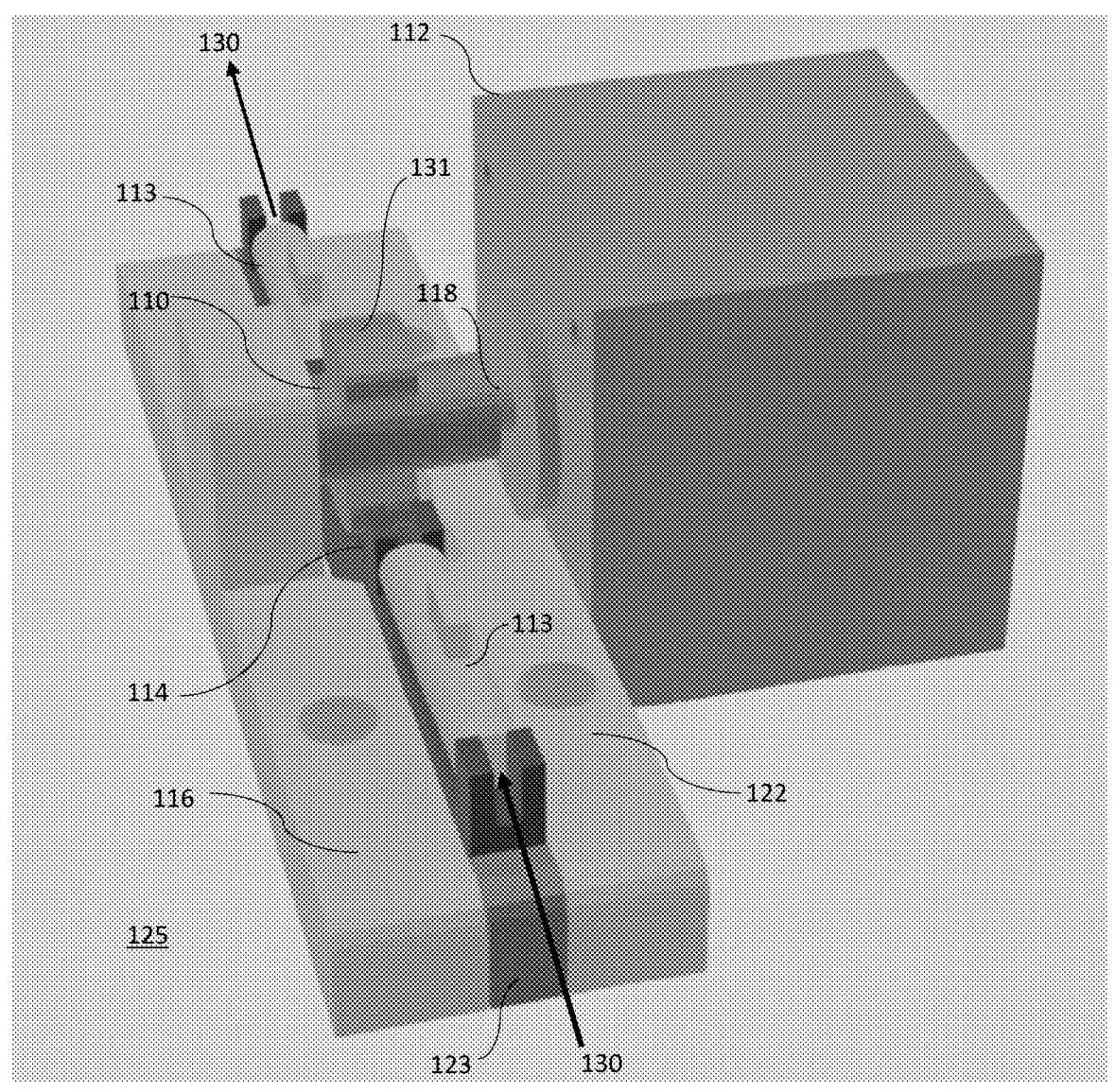
FIG. 4 provides a perspective view of one embodiment of a device as described herein.
Figure 7:
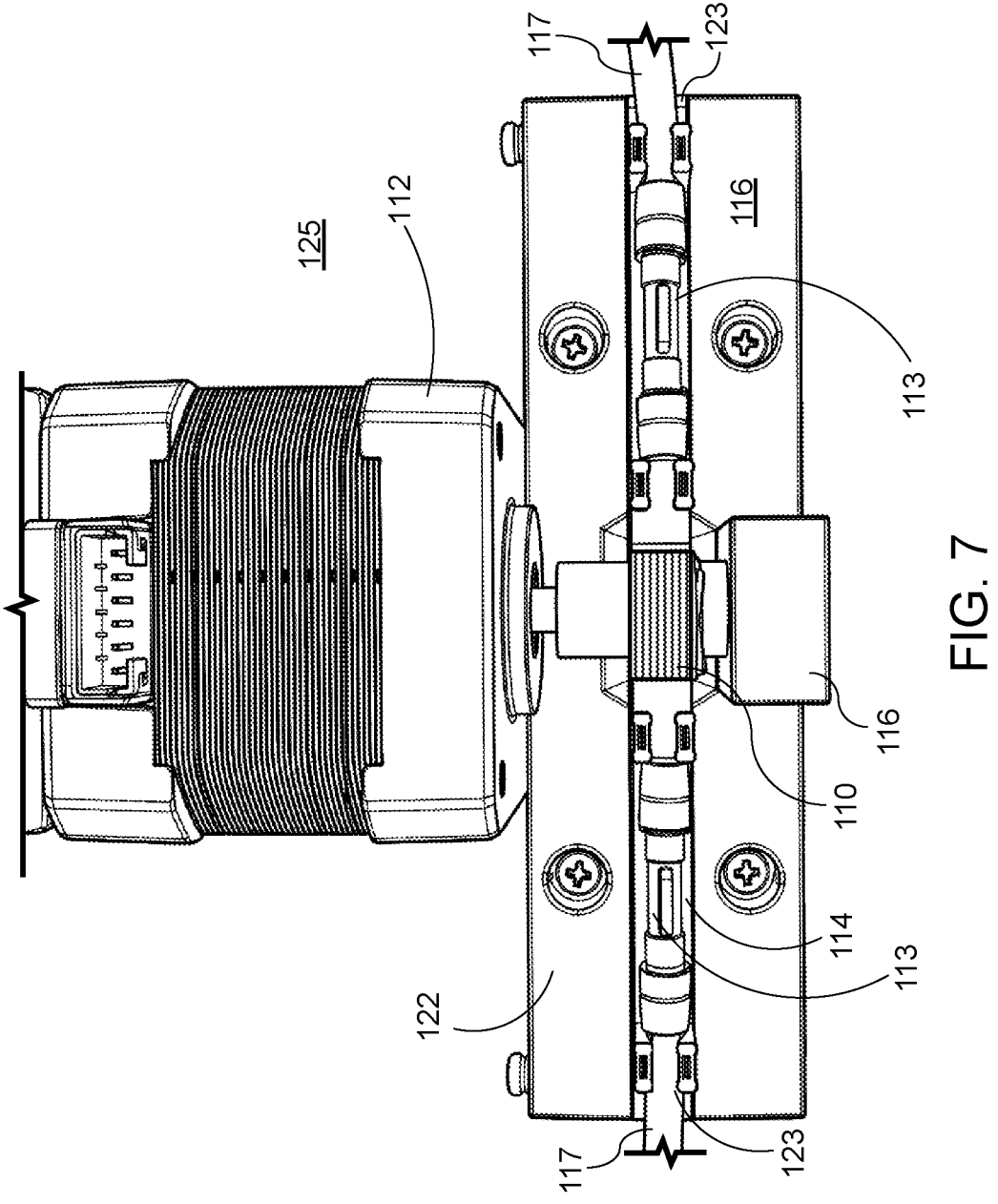
FIG. 7 provides a top view of one embodiment of a device as described herein.
Figure 8:
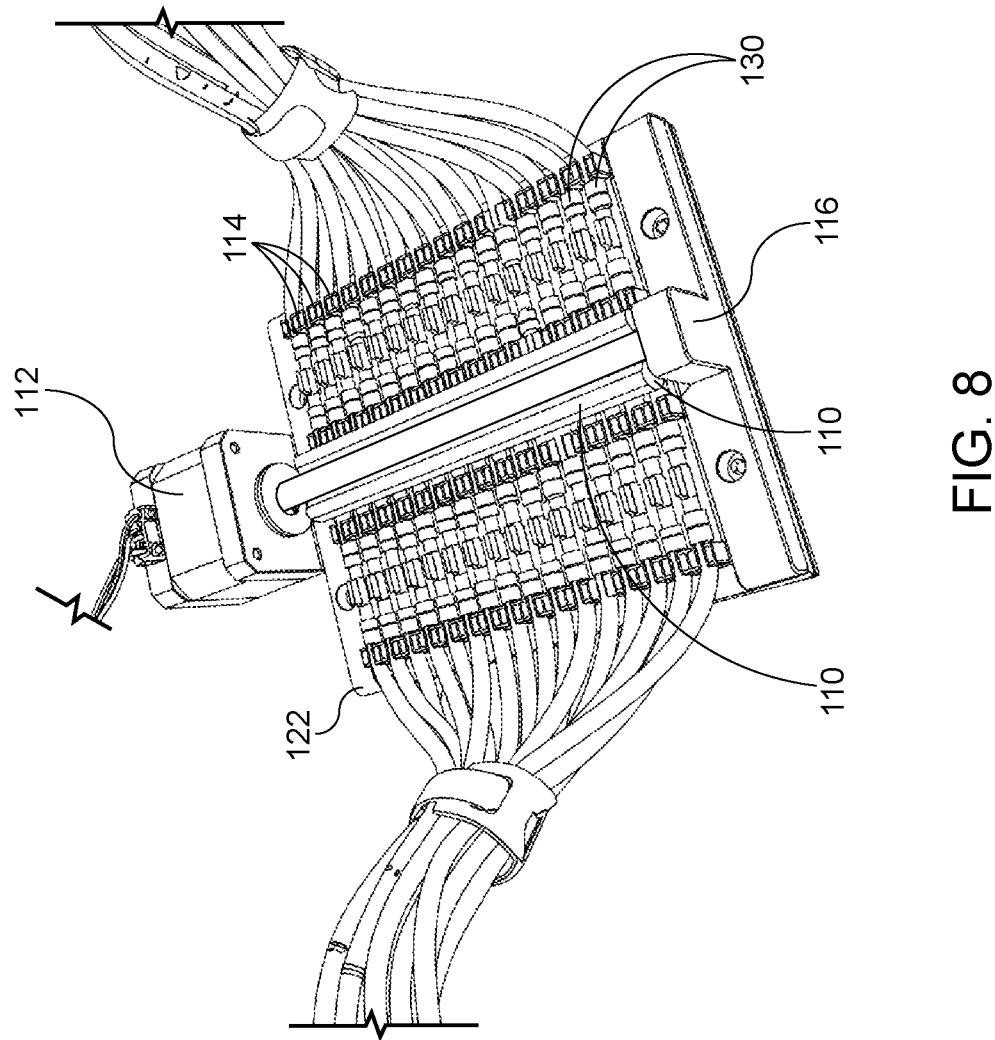
FIG. 8 illustrates a multi-channel device including 16 parallel channels.

As shown in FIG. 4 and FIG. 7, a device can include a motor block 122 and an end block 116, as well as spacers 123 that can aid in retaining the risers 114. Moreover, by designing the device so that at least the spacers 123 and one of the motor block 122 or end block 116 (and generally both) are removably attachable to other components of the device, the device can be modified to include any number of parallel channels 130. For example, FIG. 8 illustrates a device that includes 16 parallel risers 114, each of which engaging along a portion of their respective channels 130 with a single pump head 110 controlled by a single motor 112. However, the number of parallel channels of any one device, i.e., associated with a single pump, is not limited to the illustrated embodiments, and a single pump head can engage with any number of channels, e.g., from a single channel to hundreds of channels, e.g., from about 5 channels to about 200 channels, or from about 10 channels to about 100 channels in some embodiments, and a system can include multiple devices, each device including multiple parallels channels. To modify the number of parallel channels 130 of a device, it is a relatively simple matter to alter the distance between the end block 116 and the motor block 122, add or take away any number of individual risers 114, and insert a pump head 110 and spacers 123 of the proper length for the number of risers 114 and channels 130 to be utilized.

A system can include additional components and multiple individual devices. The desired number and arrangement of individual devices as well as type and number of additional components (e.g., traditional pumps, control systems, washing stations, etc.) can depend upon specific applications of the system. For example, the size and number of the channels of each device, the utilization of a single device or multiple devices on each production line, the number of production lines in a system, etc. can vary depending upon the production goal as well as the specific chemistry of the nanoparticle formation reactions, among other parameters.

Figure 9:
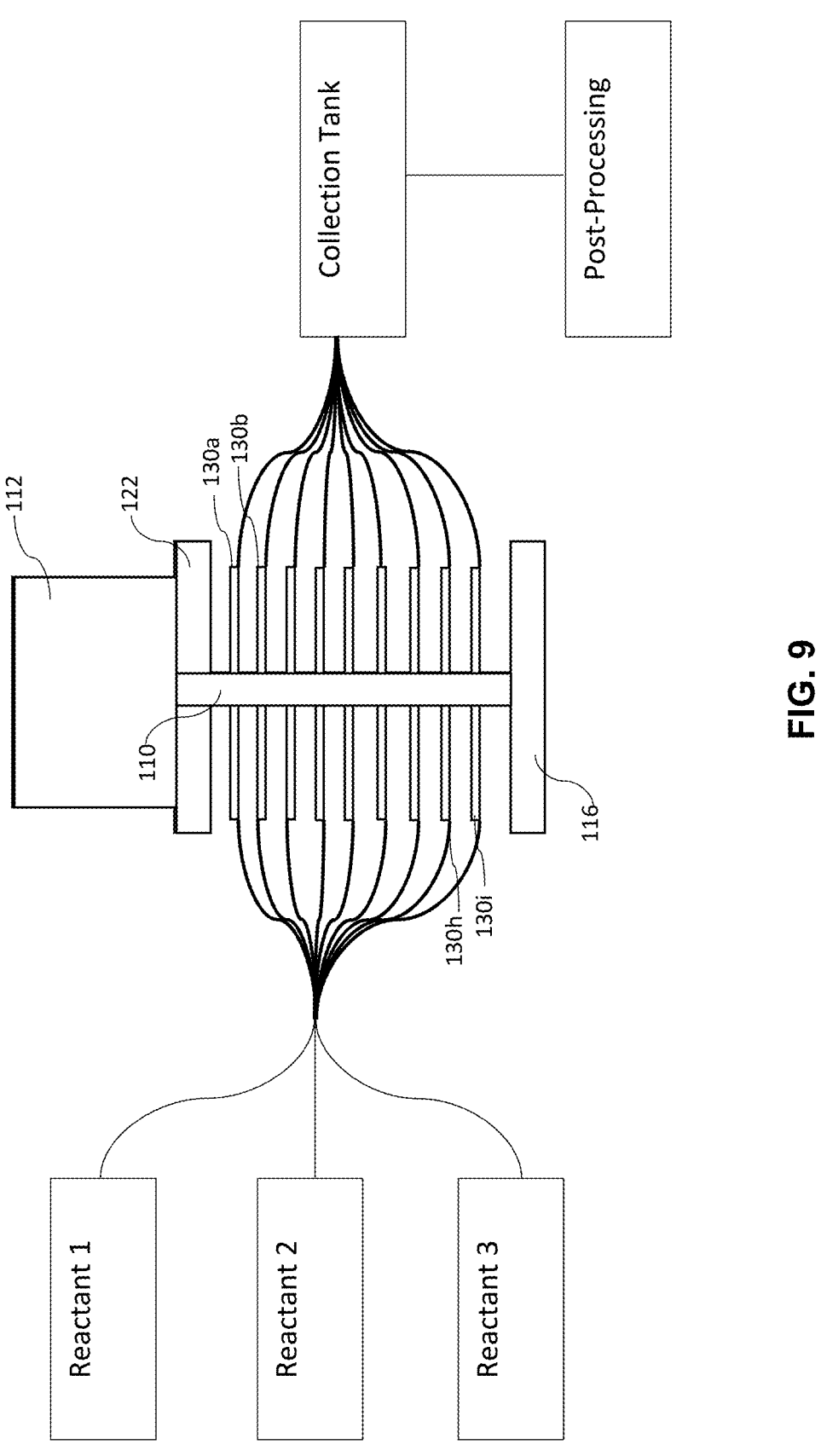
FIG. 9 schematically illustrates one embodiment of a nanoparticle formation process as disclosed herein.

FIG. 9 schematically illustrates one embodiment of a production line that incorporates a single device as disclosed herein. As illustrated, the production line can include multiple reactant fluids (Reactant 1, Reactant 2, Reactant 3) that can be combined to form a single reaction mixture. Following combination with one another and formation of a single reaction mixture, the reaction mixture, which contains all reactants necessary for forming the nanoparticles, can be split between the multiple channels of a single device (130*a*, 130*b*, . . . 130*h*, 130*i*) and simultaneously pumped to a collection tank. As each portion of the reaction mixture is pumped through each of the parallel channels of the production line, the desired reaction conditions, e.g., temperature, flow characteristics, etc., can be consistently maintained throughout all of the parallel channels.

Figure 10:
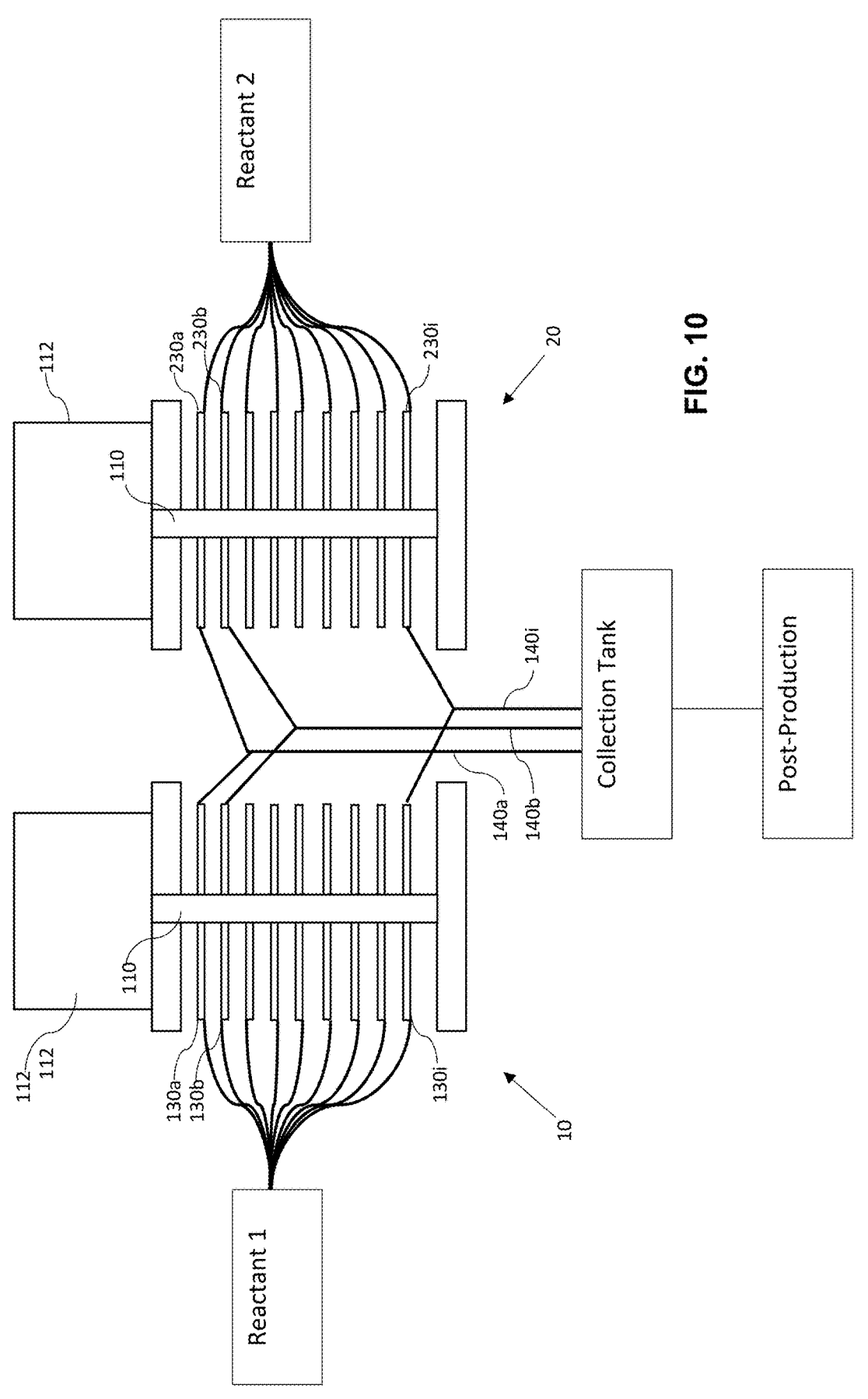
FIG. 10 schematically illustrates another embodiment of a nanoparticle formation process as disclosed herein.

FIG. 10 illustrates another embodiment of a production line. In this embodiment, a production line can include two devices 10, 20. The first device 10 can pump a portion of a reaction mixture that includes a first reactant (Reactant 1) through a series of parallel channels 130*a*, 130*b*, . . . 130*i*.

The second device 20 can pump another portion of the reaction mixture that includes a second reactant (Reactant 2) through another series of parallel channels 230*a*, 230*b*, . . . 230*i*. Downstream, the flow of a single channel from device 10 (e.g., 130*a*) can be combined with the flow of a single channel from device 20 (230*a*) to form a combined flow 140*a* that carries both reactants. Within this combined flow, the nanoparticle formation reaction can take place, and the formed nanoparticles can be delivered to the collection tank, as shown. The multiple combined flows 140*a*, 140*b*, . . . 140*i* can thus provide a high throughput of the reactants with identical (or nearly identical) flow characteristics and hence reaction conditions across the entire production line.

Of course, a single production line is not limited to any particular number of devices. Moreover, each device of a production line can pump a fluid that carries a single reactant or multiple reactants, and this flow can be combined downstream of the device with the flow pumped by use of another device that pumps a fluid that likewise can carry a single reactant or multiple reactants, or optionally combined with another fluid flow that may not carry a reactant for the nanoparticle formation reaction, but rather can provide another benefit to the combined flow, e.g., dilution, viscosity, etc.

A device, production line and system can also include additional components as are generally known, e.g., heating systems, cooling systems, heat sinks, fans, etc., to control the flow conditions within the channels and the reaction conditions of the production line. By way of example, in one embodiment, subsequent to synthesis, purification of the formed nanoparticles can be carried out prior to final utilization, for instance using a simple water wash process in a post-production procedure.

In one embodiment, a system can include various automated control systems. For instance, automated control of the devices can be utilized to improve consistency of nanoparticles formed by a system from batch to batch or over time in a continuous process. By way of example, a device can include an automated priming function that can briefly rotate the motor at its highest speed until each channel achieves a vacuum, upon which the motor can decelerate to the desired flow rate for the synthesis reaction to ensure priming on all channels and maximize yield. Preset pump settings can be used in an automated system that can improve production quality tiers of nanoparticles, for instance different quality tiers that are available for different prices and/or suitable for specific deployment scenarios.

Disclosed devices can be beneficially utilized to produce any nanoparticle that can be formed according to a fluid flow reaction scheme. By way of example, disclosed devices can be utilized to form nanoparticles according to a condensation reaction scheme, a hydrothermal reaction scheme, a solvothermal reaction scheme, or any combination of reaction schemes. In one particular embodiment, disclosed devices can be utilized in forming nanoparticles that are generally resistant to dynamic changes in the environment due to, for example, oxidation, sulfidation, aggregation, eco-corona formation, etc. and as such can be particularly beneficial in environmental applications.

Figure 11:
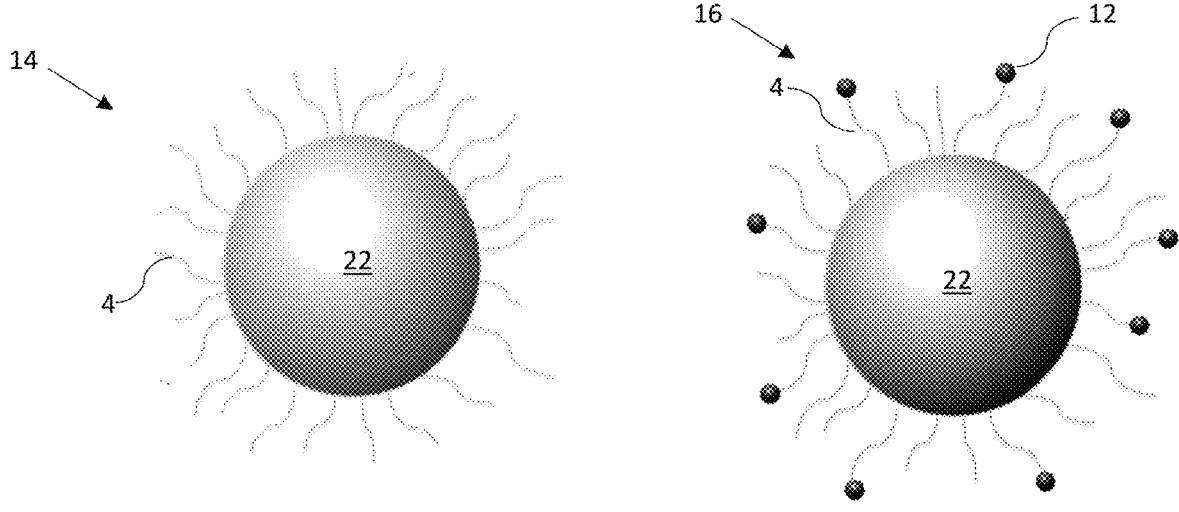
FIG. 11 schematically illustrates one embodiment of a nanoparticle as may be formed by use of disclosed devices.

By way of example, in one embodiment, a device can be utilized in forming a magnetic nanoparticle according to a condensation reaction. FIG. 11 schematically illustrates one embodiment of a magnetic nanoparticle 14 as may be formed by use of disclosed methods and systems. A nanoparticle can include a magnetic core 22 that can include a magnetic material as either a sole material or in conjunction with a non-magnetic material. For instance, a magnetic material can include a dopant as is known in the art, e.g. zinc, manganese, or the like can be incorporated in a metal nanoparticle as a dopant.

A magnetic core 22 can include one or more ferromagnetic materials, including but not limited to iron, nickel, cobalt, or combinations thereof, as well as oxides thereof. In one embodiment, the magnetic core 22 can include an iron-based material, such as an iron oxide. In embodiments, an iron oxide nanoparticle core 22 can include $Fe^{3+}$ and/or $Fe^{2+}$. For instance, a magnetic core 22 can include a combination of $Fe^{3+}$ and $Fe^{2+}$, and the molar ratio can be between about 3:1 and about 1:1 $Fe^{3+}$ to $Fe^{2+}$, such as about 2:1 $Fe^{3+}$ to $Fe^{2+}$ in some embodiments. For example, suitable iron oxides as may be included in a magnetic core 22 can include iron (II) oxide (FeO), iron (II,III) oxide ($Fe_3O_4$ or $Fe_4O_5$), iron (III) oxide ($Fe_2O_3$, optionally including $\gamma$-$Fe_2O_3$, or maghemite), etc. In one embodiment, a magnetic core 22 can be formed primarily of magnetite ($Fe_3O_4$) and/or its oxidized form maghemite ($\gamma$-$Fe_2O_3$). Such iron oxide cores can exhibit superparamagnetic properties (a.k.a., SPIONs) that can be particularly suitable for certain embodiments.

In one embodiment, a magnetic core 22 can be formed by combining a metal salt and optionally any dopants (e.g., a salt of a dopant) with an oxygen source and allowing the reaction to proceed within the reaction mixture as it is pumped through channels 130 of a system as disclosed. For instance, a first reaction liquid containing one or more metal salts (e.g., an iron salt and a metal dopant salt) and a suitable solvent (e.g., water) can be combined with a second reaction liquid that contains an oxygen source at a concentration of from about 1 M to about 10 M (e.g., ammonium hydroxide; sodium hydroxide). Metal salts which can be used in forming a magnetic core 22 can include, but are not limited to, iron-, nickel- or cobalt-based salts or combinations thereof. Suitable iron salts include, but are not limited to, iron (II) sulfate, iron (II) nitrate, iron (II) chloride, iron (II) perchlorate, iron (III) sulfate, iron (III) nitrate, iron (III) chloride, iron (III) perchlorate, and mixtures thereof.

In one embodiment, a system can be utilized in forming a core/shell nanoparticle, for instance according to a co-precipitation reaction as a reaction mixture is pumped through the multiple channels of a production line as disclosed herein. In one particular embodiment, a system can be utilized in formation of core/shell nanoparticles that include a magnetic core 22 and a polymeric material 4 at the surface of the core, for instance as a shell that completely or partially surrounds the magnetic core 22, as illustrated in FIG. 11. In general, a core/shell particle can include the shell material in an amount of about 10 wt. % or more of the total weight of the particle.

In one particular embodiment, the polymeric material 4 can form a polymeric shell around the core 22 having a thickness of a single monolayer or more of the polymer, such as about 1 nm to about 50 nm shell thickness. In some embodiments, the polymeric material 4 can partially cover a surface of the core 22, for instance covering about 10% or more of the entire surface of the core 22, about 20% or more, about 25% or more or about 50% or more, such as from about 10% to about 90%, from about 20% to about 80%. The polymeric material 4 may be chemically bonded to the core 22, and/or may be mechanically bonded to the core 22, depending on the interaction between the particular polymeric material 4 utilized and the particular material of the core 22.

As illustrated in the right panel of FIG. 11, a magnetic core/shell nanoparticle can include as the polymer 4 component a polymeric material that is capable of adsorbing a contaminant 12 as may be present in an environment in need of clean-up. In some embodiments, a polymeric material can include one or more additional materials that can improve adsorption characteristics, e.g., a small organic or inorganic ion. A variety of polymeric materials have been developed that can be utilized to adsorb or otherwise adhere to environmentally damaging materials including chemicals (metals, oils, plastics, etc.) and bio-based pathogens (algae, bacteria, etc.) as well as toxins produced from such materials. Meanwhile, the magnetic core of the core/shell nanoparticle can be utilized to control the distribution of the nanoparticles, e.g., for collection following use of the nanoparticles to adsorb one or more contaminants in an environmental clean-up application.

In one embodiment, a particle 14 can include a polyvinylpyrrolidone (PVP)-based polymer 4, either alone or in a polymeric matrix with one or more additional polymers. PVP-based polymeric matrices can be of particular benefit, as they can exhibit good resistance to environmental degradation and high adsorption of environmentally damaging materials including, without limitation, oils, metals, algal cells, bacteria, toxins emitted from biological sources, nanoplastics, etc. A PVP-based polymer can have, in particular embodiments, a molecular mass of about 10 kDa to about 360 kDa, with the lower end of the range being most effective for adsorption of the targeted contaminant (e.g., about 10 kDa to about 200 kDa).

In one embodiment, a shell on a surface of a particle 14 can include a PVP-based polymeric matrix that can optionally include a second polymer in conjunction with the PVP having aliphatic and aromatic structures similar to hydrocarbons, which can further improve the adsorption capabilities of the nanoparticles. For example, a PVP-based polymer 4 can be at least 50% by weight of the polymeric material of a polymeric shell, such as about 75% to 100% by weight. In one embodiment, the PVP-based polymer can be at least 90% by weight of the polymeric material of a polymeric shell, such as about 95% to 100% by weight. The PVP-based polymer can be polyvinylpyrrolidone (PVP) or a polyvinylpyrrolidone derivative having the core backbone based on the PVP polymeric structure.

A nanoparticle can include agents at a surface thereof that can alter the functionality of the particle. By way of example, a nanoparticle can include antimicrobial agents at a surface thereof such as antibiotics or chemicals which can reduce bacterial quorum sensing. Exemplary agents can include, without limitation, acyl homoserine lactone (AHL), metals, chelating agents, nutrient species, or the like. Inorganic elements, e.g., inorganic dopants may also be incorporated within the nanoparticle, such as in a core or a shell of a core/shell nanoparticle or on a surface of a nanoparticle. Surface agents can be a component of a polymeric shell in one embodiment, for instance bonded within or encapsulated within a polymeric matrix of a shell.

A nanoparticle formation reaction can be carried out at predetermined temperature, pressure, etc. as the reaction mixture is carried through the multiple lines, either within parallel channels of a single device or following combination with other reactants pumped by other devices, as previously described. By way of example, in one embodiment, Fe(II) and Fe(III) chlorides can be mixed with PVP at a reaction temperature of from about 20° C. to about 100° C., such as from room temperature (about 25° C.) to about 90° C. in some embodiments. The pH of the resulting mixture can then be raised upon mixing this solution with another reactant fluid that includes an oxygen source, e.g., ammonium and/or sodium hydroxide, which causes precipitation and particle growth as the mixture is pumped through a production line. Beneficially, such a synthesis can be aqueous based with utilization of no organic solvents in some embodiments.

A co-precipitation process utilizing a system as disclosed herein can be utilized to form a large amount of the core/shell particles with very high consistency, e.g., about 200 kg/year using a 4 channel device. Using a system as disclosed herein, nanoparticles can be formed with a very low particle size distribution, e.g., a polydispersity index as measured by dynamic light scattering of less than 0.3, and often less than 0.2.

Following formation, the nanoparticles can be collected and subjected to post-formation processing as desired, e.g., washing, drying, etc. For instance, the as-formed nanoparticles can be separated from the formation solution and resuspended in a clean media for storage, shipment, etc.

The present invention may be better understood with reference to the examples set forth below.

EXAMPLES

Methods and Materials

Polyvinylpyrrolidone (PVP; 10 kDa) utilized throughout the Examples was purchased from MW Sigma-Aldrich, St Louis, MO. Ferrous chloride tetrahydrate (FeCl$_2$·4H$_2$O; 98%) was purchased from Alfa Aesar, Haverhill, MA. Ferric chloride hexahydrate (FeCl$_3$·6H$_2$O; >98%) was purchased from VWR/BDH, Radnor, PA. 14.5 M ammonium hydroxide (NH$_4$OH; 28-30%) was utilized and purchased from VWR/BDH, Radnor, PA. An Isotemp® 202 water bath was utilized, obtained from Fisher Scientific, Waltham, MA.

Particle size distributions and polydispersity indices for hydrated iron oxide nanoparticles (IONPs) were estimated by dynamic light scattering (DLS-NanoSizer, Malvern, United Kingdom) at 25° C. Washed IONP samples were diluted 100× or 500× in ultrapure water (18.2 MΩ cm), then sonicated for 30 minutes. IONPs were cooled for 10 minutes, then 1 mL was pipetted into a cuvette and analyzed. The refractive index for iron oxide, 2.42, was used. The instrument measured each sample in triplicate by averaging 10-12 scans per measurement. Z-average hydrodynamic diameter in nm and unitless polydispersity index values for the samples were reported as the mean±standard deviation of all batches.

IONP yield was characterized with inductively coupled plasma-mass spectrometry (ICP-MS) (Element XR, ThermoFisher Scientific, Waltham, MA). A sample was drawn from the waste liquid discarded during the IONP wash; another sample was drawn from washed IONPs once resuspended. Blank samples used ultrahigh purity water. Each sample was diluted 3× in concentrated nitric acid (70% Trace Metal, Fisher Chemical Company, Pittsburgh, PA) and digested at room temperature for ≥8 hours. Iron as magnetic particles was determined from washed samples, and nonmagnetic iron was determined from waste liquid samples. The yield of magnetic particles was determined to be the concentration ratio of magnetic iron to total iron, expressed as a percentage.

Oil removal capacity was determined in batch tests. For each batch of synthesized IONPs, an oil and water emulsion was prepared with crude oil (MC-252, ID: A0068H, AECOM, Los Angeles, CA), filtered Atlantic seawater, and alginic acid (Alfa Aesar, Haverhill, MA) at 0.5 mg L$^{-1}$ (Chester and Stoner 1972). Seawater (50 mL) and alginic acid were added to a beaker which was then transferred to a tared analytical balance. Approximately 100 mg of oil was pipetted into the mixture, which was then mixed on low speed for 30 seconds with a handheld immersion blender (KitchenAid, Benton Harbor, MI) while an additional 50 ml of water was slowly added. The emulsion was allowed to rest, and samples were taken from below the surface to minimize transfer of the surface slick. A standard curve from 0-1,000 mg L$^{-1}$ crude oil was prepared from each oil and water emulsion. Blank samples for untreated oil-in-water and uncontaminated seawater were produced alongside experimental samples containing oil-in-water and with varying IONP concentrations. A vortex mixer was used to agitate each sample for 2-3 seconds, then placed next to an N-52 magnet for 60 minutes to remove IONP/oil complexes. Liquid samples were taken to measure polycyclic aromatic hydrocarbons via fluorescence spectroscopy (RF-6000, Shimadzu, Kyoto, Japan) using a 337 nm excitation beam and 350-650 nm emission range (Geddes and Lakowicz 2005). A trapezoidal integration method (Tai 1994) was used to estimate the area under the curve for all samples. Oil concentration percent change and oil removal capacity, the number of grams oil sorbed per gram of IONP used, were reported.

IONPs were washed following formation. The suspension collected from the formation was diluted to 500 mL with ultrahigh purity water and briefly immersed in an ultrasonic bath (Bransonic M2800, Branson, Danbury, CT). The solution was placed next to a neodymium magnet (BZXOYOXO-N52, K&J Magnetics, Pipersville, PA) for 60 minutes, after which the 500 mL liquid was removed and replaced with an equal volume of ultrahigh purity water. The IONPs were resuspended in the ultrasonic bath and stored at 4° C. in between benchmark experiments.

Example 1

A pump system as illustrated FIG. 1-FIG. 7 was utilized. The system included a pump head 110 fastened to a NEMA-17 stepper motor 112, a riser 114 with ability to set riser height deficit 115 from the pump head 110, and an end block 116, which allowed risers to be added in parallel. CNC code was generated using Cura (4.11.0, Ultimaker, Chorley, England). Parts were 3D printed using polylactic acid (PLA, 1.75 mm, MatterHackers, Lake Forest, CA) or polyethylene terephthalate glycol (PETG, 1.75 mm, MatterHackers, Lake Forest, CA).

Co-precipitation reaction conditions included reaction under ambient pressure at approximately 90° C. PVP, FeCl$_2$·4H$_2$O, and FeCl$_3$·6H$_2$O were mixed and heated to about 90° C. in a water bath. A room temperature stream of NH$_4$OH was used. The streams were then combined and pumped through the system as described.

Formation was repeated in triplicate at 50, 150, and 300 rpm motor speeds. Risers with a height deficit of 1.2 mm to 2.4 mm and pump heads with 1-, 2-, and 4-rollers were tested. PLA and PETG were tested as the pump head materials, and oil was tested as a lubricant for the pump head/tubing interface. Motor current varied from 0.5 A to 2.5 A. Flow rate tests were conducted while using the minimum current required to achieve 100% self-priming.

The stepper motor 112 was a NEMA-17 with a heat sink attached and fixed to the motor block 122. A pump head 110 with the desired number of rollers was attached to the rotating shaft 118 of the stepper motor 112 and held in place by an end block 116. The riser 114 held the tubing 117 in place along the channel 130 with the aid of vacuum connectors 113. Spacers 123 held the riser 114 in place. The motor block 122 and end block 116 were screwed into a base plate 125. Channel capacity was increased by sliding the end block 116 to accommodate additional risers and swapping pump heads 110 and spacers 123 of the desired length.

The following variable were examined:

TABLE 1

| Component | Variable | Range Tested |
| --- | --- | --- |
| Pump Head | Material | PLA, PETG, oiled variants |
| | Roller Count | 1-4 |
| Riser | Height Deficit | 1.2 mm-2.4 mm |
| | Parallel Channels | 1-16 |
| Motor | Current | 0.5-2.5 A |
| | Speed | 50-300 RPM |

Results from the first screening test with unoiled PLA pump heads indicated issues with friction at 300 rpm, where both roller and tubing wear was observed for all trials. The 2-roller pump head and 1.2 mm riser worked best in this test, despite the damage that was observed at high speed. This damage suggested that adding a lubricant to the pump may have reduced wear to usable rates.

A second screening test with unoiled PETG pump heads was carried out. This test indicated that the 4-roller pump head and 1.6 mm riser worked best with PETG under the conditions tested. While tubing wear was observed for most trials, there were several trials in which roller wear was not observed and scores were adjusted by a half point to indicate the minor increase in efficacy. Since PETG is more heat resistant than PLA, the reduced wear on rollers suggested a heat-related deformation caused by friction between unoiled parts. Another difference between the materials was that the 1.2 mm riser jammed the motor for all PETG trials but was the most effective for PLA. This difference in performance may be due to the resolution of the parts, where PLA was able to be printed at a higher resolution than PETG and the resulting prints are more accurate to the 3 D model.

A third screening test with oiled PLA and PETG pump heads was carried out. The results from each test were identical, where both 2- and 4-roller pump heads scored equally well and demonstrated ideal performance with a 1.2 mm riser for all three speeds tested. Since there was no apparent difference between materials and roller conformation in this screening test, flow performance metrics were compared for all groups.

The linear regression model of $V_{rev}$ was developed for each test series. The y-intercept was fixed at 0 for these models since 0 rpm motor speed will give a response of 0 mL/min for volumetric flow rate. From the models, the 2-roller PLA system and the 4-roller PETG system had the highest and lowest $V_{rev}$ at 0.117 and 0.082 mL/rev, respectively.

Figure 13:
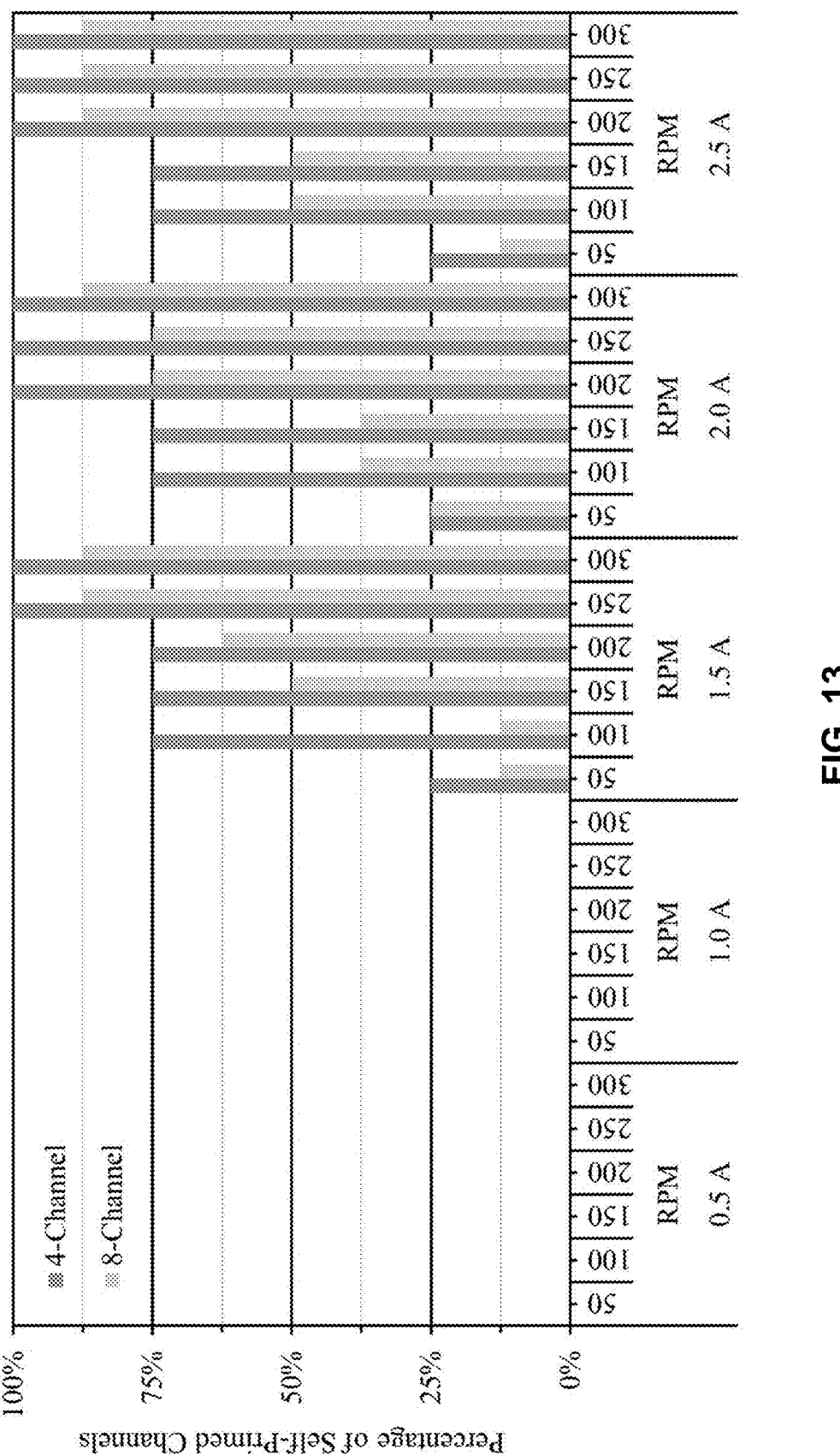
FIG. 13 graphically illustrates results of a multi-channel formation device and method as described herein.

A multi-channel pump arrangement with 16 parallel channels is shown in FIG. 8. Results are shown in FIG. 13. While 4-, 8-, and 16-channel configurations were tested, only 4- and 8-channel configurations were able to self-prime any number of channels at the tested currents, and only the 4-channel system was able to self-prime 100% of its channels at the tested currents. End blocks 116, which maintained the height deficit for each channel, required occasional reprinting due to wear. The amount of current delivered to the motor also influenced the number of channels that self-primed. At 0.5-1 A, there was not enough torque to pump any liquid. As current increased, the threshold for motor speed required to self-prime a given number of channels decreased. For example, at 2.0-2.5 A, 200 rpm were required to self-prime every channel, while 250 rpm were required to self-prime every channel at 1.5 A. The frequency of jams also decreased with higher current.

Figure 12:
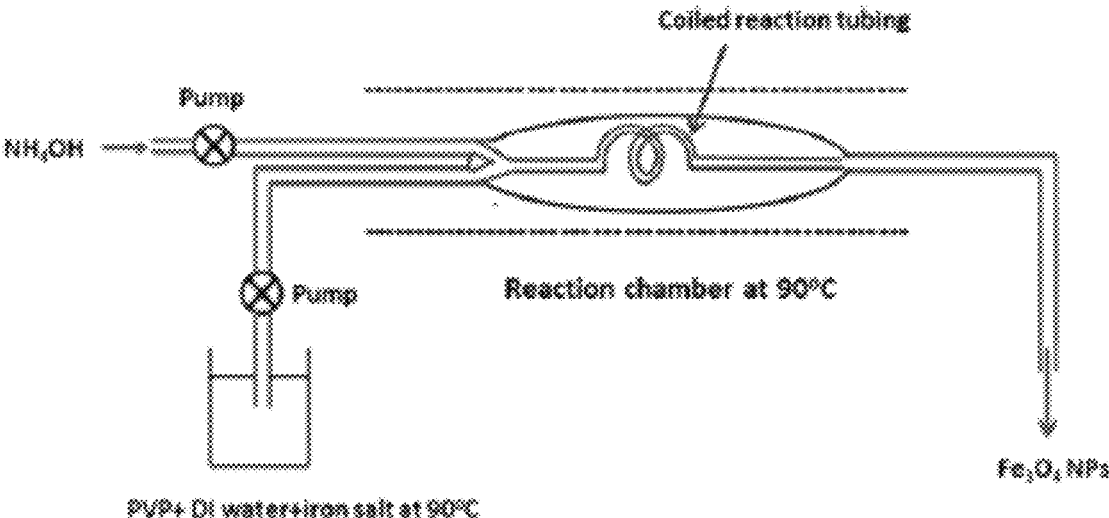
FIG. 12 schematically illustrates a prior art single channel formation system utilized as a comparison system in the Examples provided herein.

A previously described single-channel flow-through synthesis method for IONPs (Kadel et al. 2018; FIG. 12) was replicated for comparison. The method used a modified co-precipitation reaction under ambient pressure at approximately 90° C. PVP was mixed into a solution of $FeCl_2 \cdot 4H_2O$ and $FeCl_3 \cdot 6H_2O$ and heated to about 90° C. in a water bath. A room temperature solution of 14.5 M ammonium hydroxide was prepared in a separate container. Once the iron salt solution reached 90° C., a peristaltic pump (Masterflex C/L 77122-24, Cole-Parmer, Vernon Hills, IL) was used to transfer each solution at about 25 mL $min^{-1}$. The streams were combined into a single 3 m length of tubing held at 90° C. in a water bath.

An advantage of the multi-channel system was a proportional increase in overall flow rate based on the number of channels used. The optimal volumetric flow rate established for the comparison system was about 25 mL $min^{-1}$ per pump, while the new system met this parameter for each channel which increased throughput four-fold for the 4-channel system.

Example 2

The 4-channel apparatus with 2-roller PETG pump head, 1.2 mm riser, and 2.0 A motor current was selected for nanoparticle synthesis trials. Benchmarks for the comparison synthesis system and the inventive 4-channel synthesis system are presented side by side below in Table 2, which shows the results from DLS analysis describing the distribution of nanoparticle sizes in suspension.

TABLE 2

| Replicate | Dilution | Comparison System | | 4 Channel Synthesis | |
| --- | --- | --- | --- | --- | --- |
| | | Z-average (d. nm.) | Poly-dispersity Index (PDI) | Z-average (d. nm.) | Poly-dispersity Index (PDI) |
| #1 | 100× | 146 | 0.209 | 323 | 0.584 |
| | 500× | 207 | 0.307 | 568 | 0.249 |
| #2 | 100× | 108 | 0.207 | 177 | 0.362 |
| | 500× | 139 | 0.234 | 427 | 0.408 |
| #3 | 100× | 146 | 0.238 | 279 | 0.249 |
| | 500× | 170 | 0.285 | 585 | 0.335 |
| Mean | 100× | 133 ± 22 | 0.218 ± 0.017 | 260 ± 75 | 0.398 ± 0.170 |
| | 500× | 189 ± 26 | 0.275 ± 0.037 | 527 ± 87 | 0.331 ± 0.080 |

DLS on the nanoparticles from the comparison single channel synthesis indicated a mean hydrodynamic diameter of 133±22 nm and a polydispersity index of 0.218±0.017 for washed IONPs diluted 100×. Washed IONPs diluted 500× showed a hydrodynamic diameter of 172±34 nm and a polydispersity index of 0.275±0.037.

IONPs produced with the inventive pump system showed an average hydrodynamic diameter of 260±75 nm with a polydispersity index of 0.398±0.170 at 100× dilution versus 527±87 nm and 0.331±0.080 at 500× dilution.

IONP yield from both synthesis methods is shown below in Table 3.

TABLE 3

| Replicate | Fraction | Comparison System | | 4 Channel Synthesis | |
| | | Iron (ppm) | % Magnetic NPs | Iron (ppm) | % Magnetic NPs |
|---|---|---|---|---|---|
| #1 | Wash | 447 | 99.7% | 725 | 99.8% |
| | Waste | 1.4 | | 1.3 | |
| #2 | Wash | 600 | 99.8% | 488 | 99.9% |
| | Waste | 1.1 | | 0.6 | |
| #3 | Wash | 585 | 99.8% | 598 | 99.7% |
| | Waste | 1.2 | | 1.8 | |
| Mean | Wash | 544 ± 84 | 99.8 ± 0.1% | 604 ± 119 | 99.8 ± 0.1% |
| | Waste | 1.2 ± 0.2 | | 1.2 ± 0.6 | |

Percent yield of magnetic particles was statistically indistinguishable for both methods. The mean concentration of IONPs produced per channel was measured as 604±119 mg $L^{-1}$ for the inventive system and 544±85 mg $L^{-1}$ for the comparison system, though this difference was insignificant due to the variance between each batch. Non-magnetic iron was removed during washing at 1.2 mg $L^{-1}$ for both methods, which indicates that yield was the same for both methods.

Oil removal reports are shown in Table 4 for the comparison synthesis and in Table 4 for the 4 channel synthesis. The samples were diluted from the nanoparticle stock as indicated (e.g., 40 times dilution, 20 times dilution, etc.)

TABLE 4

| Sample | Oil (ppm) | NP (ppm Iron) | % Oil Removal | Removal Capacity |
|---|---|---|---|---|
| Oil | 273 ± 8 | 0 ± 0 | 0 ± 0% | 0 ± 0 |
| 40× | 45 ± 9 | 14 ± 2 | 83 ± 4% | 17 ± 2 |
| 20× | 14 ± 4 | 27 ± 4 | 95 ± 2% | 10 ± 1 |
| 10× | 4 ± 2 | 55 ± 9 | 99 ± 1% | 5 ± 1 |
| SW | 0 ± 0 | 0 ± 0 | 100 ± 0% | 0 ± 0 |

TABLE 5

| Sample | Oil (ppm) | NP (ppm Iron) | % Oil Removal | Removal Capacity |
|---|---|---|---|---|
| Oil | 304 ± 22 | 0 ± 0 | 0 ± 0% | 0 ± 0 |
| 40× | 90 ± 21 | 15 ± 3 | 70 ± 9% | 15 ± 4 |
| 20× | 38 ± 10 | 30 ± 6 | 87 ± 4% | 9 ± 2 |
| 10× | 14 ± 4 | 60 ± 12 | 95 ± 2% | 5 ± 1 |
| SW | 0 ± 0 | 0 ± 0 | 100 ± 0% | 0 ± 0 |

Oil removal capacity was reported at up to 17±2 grams of oil sorbed per gram of IONPs and 15±4 grams of oil sorbed per gram of IONPs for the comparison and inventive synthesis methods, respectively. While there was some variation in the initial system conditions, the oil removal capacity metric effectively normalized these differences. A process improvement was also made to oil-water emulsion preparation, which improved consistency for fluorescence analysis, increased production rate and volumes, and enabled higher gravity emulsions to be prepared compared to previous studies where small-batch sonication methods were used to produce the emulsions.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming magnetic nanoparticles, comprising:

pumping by use of a first pump a first portion of a reaction mixture through a first channel;

simultaneously pumping by use of the first pump a second portion of the reaction mixture through a second channel, the first portion and the second portion both containing a first reactant, the first reactant comprising a metal salt;

reacting the first reactant with one or more additional reactants comprising an oxygen source to form the magnetic nanoparticles, wherein the first reactant and the one or more additional reactants react according to a precipitation reaction forming the magnetic nanoparticles comprising a metal of the metal salt; and collecting the magnetic nanoparticles.

2. The method of claim 1, further comprising:

combining a first fluid comprising the first reactant with a second fluid comprising a second reactant to form the reaction mixture; and separating the reaction mixture to form the first portion and the second portion.

3. The method of claim 1, further comprising:

pumping by use of a second pump a third portion of the reaction mixture through a third channel and a fourth portion of the reaction mixture through a fourth channel, the third portion and the fourth portion both containing a second reactant;

combining the first portion with the third portion;

combining the second portion with the fourth portion.

4. The method of claim 1, further comprising: simultaneously pumping by use of the first pump one or more additional portions of the reaction mixture through one or more additional channels, the one or more additional channels being aligned with the first channel and the second channel, the additional portions comprising the first reactant.

5. The method of claim 1, wherein the nanoparticles are formed at a temperature of from about 20° C. to about 100° C.

6. The method of claim 1, wherein the nanoparticles are formed at room temperature.

7. The method of claim 1, wherein the first pump is a peristaltic pump.

8. The method of claim 1, wherein the oxygen source comprises sodium hydroxide or ammonium hydroxide.

9. The method of claim 1, the one or more additional reactants further comprising a polymer.

10. The method of claim 9, wherein the magnetic nanoparticles comprise a core comprising the metal and a shell comprising the polymer.

11. The method of claim 9, wherein the polymer comprises polyvinylpyrrolidone.

* * * * *